US012768435B2

(12) United States Patent
Shirokoshi

(10) Patent No.: US 12,768,435 B2
(45) Date of Patent: Oct. 20, 2026

(54) STRAIN WAVE GEARING AND EXTERNALLY TOOTHED GEAR

(71) Applicant: HARMONIC DRIVE SYSTEMS INC., Tokyo (JP)

(72) Inventor: Norio Shirokoshi, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 213 days.

(21) Appl. No.: 18/834,544

(22) PCT Filed: Jan. 30, 2023

(86) PCT No.: PCT/JP2023/002932

§ 371 (c)(1),
(2) Date: Jul. 30, 2024

(87) PCT Pub. No.: WO2024/161478

PCT Pub. Date: Aug. 8, 2024

(65) Prior Publication Data

US 2026/0185594 A1 Jul. 2, 2026

(51) Int. Cl.
*F16H 49/00* (2006.01)
*F16H 55/08* (2006.01)

(52) U.S. Cl.
CPC ....... *F16H 49/001* (2013.01); *F16H 55/0833* (2013.01); *F16H 2049/003* (2013.01)

(58) Field of Classification Search
CPC ............. F16H 49/001; F16H 2049/003; F16H 55/0833
See application file for complete search history.

(56) References Cited

U.S. PATENT DOCUMENTS 4,817,457 A 4/1989 Carlson
2014/0165758 A1 6/2014 Moune et al.
(Continued)

FOREIGN PATENT DOCUMENTS

CN 211968217 U 11/2020
JP S62-075153 A 4/1987
(Continued)

OTHER PUBLICATIONS

PCT/ISA/210, "International Search Report for PCT International Application No. PCT/JP2023/002932," Apr. 11, 2023.

*Primary Examiner* — Joseph Brown
(74) *Attorney, Agent, or Firm* — Kreative IP Management LLC; Fuiycong Kim

(57) ABSTRACT

An externally toothed gear of a strain wave gearing is provided with external teeth, the tooth profile of which gradually changes along the tooth trace direction. The external teeth each includes an external tooth portion that is capable of meshing between internal teeth of an internally toothed gear, and an external tooth extension portion that does not mesh with the internal teeth. The external tooth extension portion has a tapered tooth profile that tapers off, and serves as a guide when each of the external teeth is inserted between the internal teeth. The tooth profile of the external tooth extension portion is slightly smaller than that of the external tooth portion, to which the external tooth extension portion is linked. The tooth profile does not protrude in the tooth depth direction or the tooth thickness direction from the tooth profile due to misalignment of a molding die.

8 Claims, 3 Drawing Sheets

(56) References Cited

U.S. PATENT DOCUMENTS

| | | | |
|---|---|---|---|
| 2017/0175869 A1 | 6/2017 | Kiyosawa et al. | |
| 2022/0333673 A1 | 10/2022 | Shirokoshi | |
| 2023/0160462 A1* | 5/2023 | Tsubone ................. | B25J 9/1025 74/413 |

FOREIGN PATENT DOCUMENTS

| | | | |
|---|---|---|---|
| JP | S63-062935 A | 3/1988 | |
| JP | H5-052404 U | 7/1993 | |
| JP | 2017-044287 A | 3/2017 | |
| WO | 2013/024511 A1 | 2/2013 | |
| WO | 2016/013381 A1 | 1/2016 | |
| WO | 2021/140592 A1 | 7/2021 | |

* cited by examiner

STRAIN WAVE GEARING AND EXTERNALLY TOOTHED GEAR

CROSS-REFERENCE TO RELATED APPLICATIONS

This application is a national stage entry of International Application No. PCT/JP2023/002932, filed on Jan. 30, 2023, the entire disclosures of which are hereby incorporated by reference herein.

TECHNICAL FIELD

The present invention relates to a strain wave gearing comprising an externally toothed gear that is a molded article, and particularly relates to an externally toothed gear provided with an external tooth shape that makes it possible to easily fit the externally toothed gear together with an internally toothed gear.

BACKGROUND ART

Externally toothed gears of strain wave gearings are typically manufactured through cutting processes, but manufacturing an externally toothed gear using a molding die is also known. Patent Document 1 indicates that an externally toothed gear on which external teeth are integrally formed is manufactured using a metal die provided with cavity portions corresponding to the external teeth of the externally toothed gear (claim 5, etc., in Patent Document 1). Patent Document 2 discloses forming a flexspline (externally toothed gear) as an article molded from a resin.

In consideration of the tooth-trace-direction flexibility of externally toothed gears in strain wave gearings, externally toothed gears provided with tooth profiles with which tooth contact can be enhanced and interference with internal teeth of internally toothed gears is avoided have been proposed. For example, Patent Document 3 discloses a strain wave gearing comprising a tapered externally toothed gear, and Patent Document 4 discloses a cup-shaped externally toothed gear in which the tooth thickness gradually decreases along the tooth trace from an open-end side of the externally toothed gear.

In cases where an externally toothed gear of a strain wave gearing is manufactured as a molded article using a molding die, parting-line traces remain on the outer peripheral surface of the externally toothed gear at a portion corresponding to the parting line of the molding die. It is necessary to, inter alia, design a metal die so that the position of the parting line is set off from an external tooth formation portion of the externally toothed gear. Additionally, when the externally toothed gear is inserted into the internally toothed gear, it is necessary to prevent the parting-line traces from hindering the insertion work. Furthermore, it is necessary to apply a draft angle to the molded article in order to eject the molded article from the molding die. Additionally, in cases where, for example, the externally toothed gear is cup-shaped, an external tooth shape in which the size of a tooth profile gradually decreases along the tooth trace in a die pulling-out direction is employed. In the case of a molded article of an externally toothed gear provided with a tooth profile that changes along the tooth trace (three-dimensional tooth profile), it is difficult to insert the externally toothed gear into the internally toothed gear from the side where the size of the tooth profile is greater to assemble the two gears.

In view of the foregoing, the inventors proposed, in Patent Document 5, a strain wave gearing configured to be capable of overcoming the problem that it is difficult to assemble an externally toothed gear in an internally toothed gear due to parting-line traces in cases where the externally toothed gear is a molded article. In the aforementioned strain wave gearing, external teeth of the externally toothed gear are each provided with an external tooth portion that is capable of meshing with internal teeth of the internally toothed gear, and an external tooth extension portion that is formed at a position set off from the internal teeth in the tooth trace direction. A molding die is designed so that the parting line of the molding die is positioned at the boundaries between the external tooth portions and the external tooth extension portions. A draft angle for die molding in an opposite direction along the tooth trace direction is applied to the external tooth portions and the external tooth extension portions, using the position of the parting line as a border. The tooth profile of the external tooth extension portions changes along the tooth trace direction so that the external tooth extension portions will serve as a guide for instances when the externally toothed gear is inserted into the internally toothed gear. Because the small-diameter external tooth extension portions function as a guide for instances when external teeth are inserted between the internal teeth of the internally toothed gear even if the tooth profile of the external tooth portions is a three-dimensional tooth profile that changes along the tooth trace direction, it will be easy to carry out work for fitting the externally toothed gear together with the internally toothed gear.

PRIOR-ART DOCUMENT

Patent Document

Patent DOCUMENT 1: JP S63-62935 A
Patent DOCUMENT 2: JU H5-52404 A
Patent DOCUMENT 3: JP S62-75153 A
Patent DOCUMENT 4: JP 2017-44287 A
Patent DOCUMENT 5: WO 2021/140592 A1

DISCLOSURE OF THE INVENTION

Problems to be Solved by the Invention

In the externally toothed gear of the strain wave gearing proposed in Patent Document 5, at boundary positions where the parting line of the molding die is positioned, the boundary positions being located between the external tooth guide portions, which are external tooth extension portions, and the external tooth portions, the external tooth portions and the external tooth extension portions are formed to have tooth profiles of the same size. The size (height, outside diameter, etc.) of the tooth profiles is greatest at these positions.

If the molding die is misaligned during molding of the externally toothed gear, then the two aforementioned tooth profiles will be misaligned at the boundary positions between the external tooth portions and the external tooth extension portions (external tooth guide portions) in the externally toothed gear after molding. Due to this misalignment, the shape of the tooth profile at the boundaries between the external tooth portions and the external tooth extension portions will be larger than necessary, and when the external teeth are inserted between the internal teeth, the boundary portions between the external teeth and the external tooth guide portions could become a hindrance and it could be difficult to insert the external teeth between the internal teeth. Additionally, in cases where burrs are formed as parting-line traces at the boundary portions where misalignment occurs, deburring work will not be easy.

The present invention was contrived in view of the foregoing new problem, it being an object of the present invention to provide: an externally toothed gear configured such that external tooth guide portions are suitably formed so that it is easy to carry out work for fitting the externally toothed gear, which is a molded article comprising a tapered tooth profile or other three-dimensional tooth profile, into an internally toothed gear; and a strain wave gearing comprising the aforementioned externally toothed gear.

Means Used to Solve the Above-Mentioned Problems

In order to solve the aforementioned problem, the strain wave gearing according to the present invention comprises:

a rigid internally toothed gear; a flexible externally toothed gear that is coaxially disposed on the inner side of the internally toothed gear, and a wave generator that is fitted to the inner side of the externally toothed gear; and the externally toothed gear being a molded article, wherein external teeth of the externally toothed gear are each provided with an external tooth portion that is capable of meshing with internal teeth of the internally toothed gear, and an external tooth extension portion that is formed at a position set off from the internal teeth in a tooth trace direction and does not contribute to meshing with the internal teeth;

the external tooth portions are each such that at least a top land circle diameter gradually decreases from a first end on one side in the tooth trace direction toward a second end on the other side in the tooth trace direction, with a first draft angle for die molding in a first direction along the tooth trace direction being formed;

the external tooth extension portions are external tooth insertion guides when the external teeth are inserted between the internal teeth from the first-end side along the tooth trace direction, the external tooth extension portions extending, continuously with the first ends of the external tooth portions, in a direction away from the first ends along the tooth trace direction; and the top land circle diameter of the external tooth extension portions is less than the top land circle diameter of the external tooth portions at the first ends of the external tooth portions, and gradually decreases from connection ends, which are linked to the first ends, as the distance from the connection ends along the tooth trace direction increases, with a second draft angle for die molding in a second direction opposite the direction of the first draft angle being formed.

Additionally, the externally toothed gear of a strain wave gearing according to the present invention comprises a cylindrical barrel part that is capable of flexing in a radial direction, and external teeth that are formed on an outer-peripheral-surface portion of the cylindrical barrel part, the externally toothed gear being a molded article in which the external teeth are formed integrally with the cylindrical barrel part using a molding die, the externally toothed gear being characterized in that:

the external teeth are each provided with an external tooth portion that is capable of meshing with internal teeth of an internally toothed gear of the strain wave gearing, and an external tooth extension portion that does not contribute to meshing with the internal teeth;

the external tooth portions are each such that at least a top land circle diameter gradually decreases from a first end on one side in the tooth trace direction toward a second end on the other side in the tooth trace direction, with a first draft angle for die molding in a first direction along the tooth trace direction being formed;

the external tooth extension portions are external tooth insertion guides for instances when the external teeth are inserted between the internal teeth from the first-end side along the tooth trace direction, the external tooth extension portions extending, continuously with the first ends of the external tooth portions, in a direction away from the first ends along the tooth trace direction; and the top land circle diameter of the external tooth extension portions is less than the top land circle diameter of the external tooth portions at the first ends of the external tooth portions, and gradually decreases from connection ends, which are linked to the first ends, as the distance from the connection ends along the tooth trace direction increases, with a second draft angle for die molding in a second direction opposite the direction of the first draft angle being formed.

Effects of the Invention

In the present invention, the tooth height (top land circle diameter) of the external tooth extension portions, which function as external tooth insertion guides when the externally toothed gear is inserted into the internally toothed gear, is made less than the tooth height (top land circle diameter) at first ends of the external tooth portions. The extent to which the tooth height of the external tooth extension portions is to be made less than the tooth height at the first ends of the external tooth portions is to be set in consideration of misalignment of the molding die. This prevents the tooth profile of the external tooth extension portions, which are linked to the first ends, from protruding from the tooth-profile end surface of the first ends of the external tooth portions even when the molding die is misaligned. Thus, the greatest height of the external teeth is always the height of the tooth profile at the first ends of the external tooth portions, which mesh with the internal teeth; therefore, it is possible to overcome the problem that it is difficult to insert the external teeth between the internal teeth due to misalignment of the molding die. It is also possible to easily remove burrs that are produced at the boundaries between the external tooth portions and the external tooth extension portions.

MODE FOR CARRYING OUT THE INVENTION

An embodiment of the strain wave gearing to which the present invention is applied is described below with reference to the accompanying drawings. The embodiment described below illustrates an example of applying the present application; the present invention is in no way limited to this embodiment.

Embodiment 1

Figure 1:
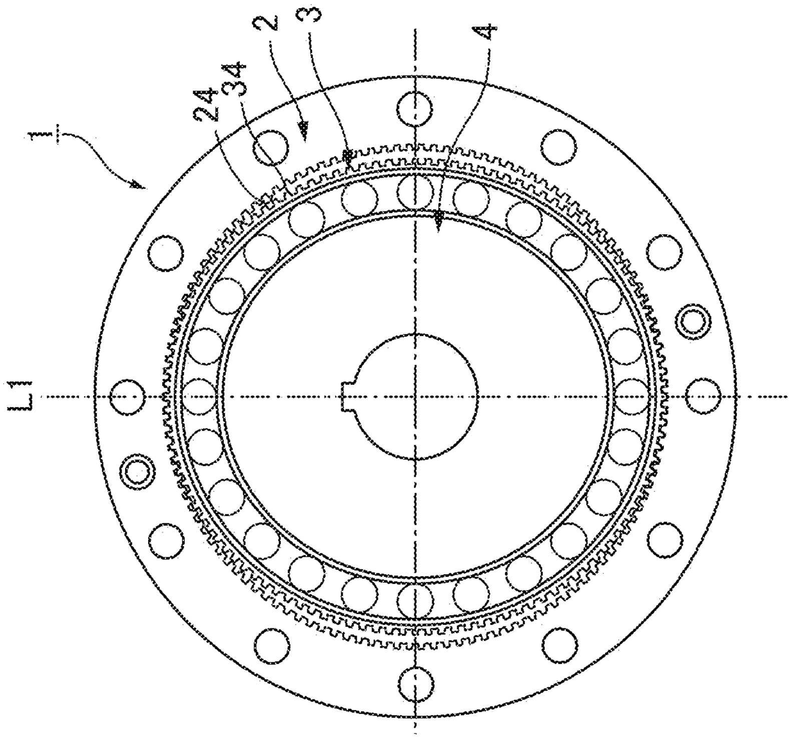
FIG. 1(A) is a longitudinal cross-section of a strain wave gearing.
FIG. 1(B) is a schematic diagram showing a state in which internal teeth mesh with external teeth.
Figure 1:
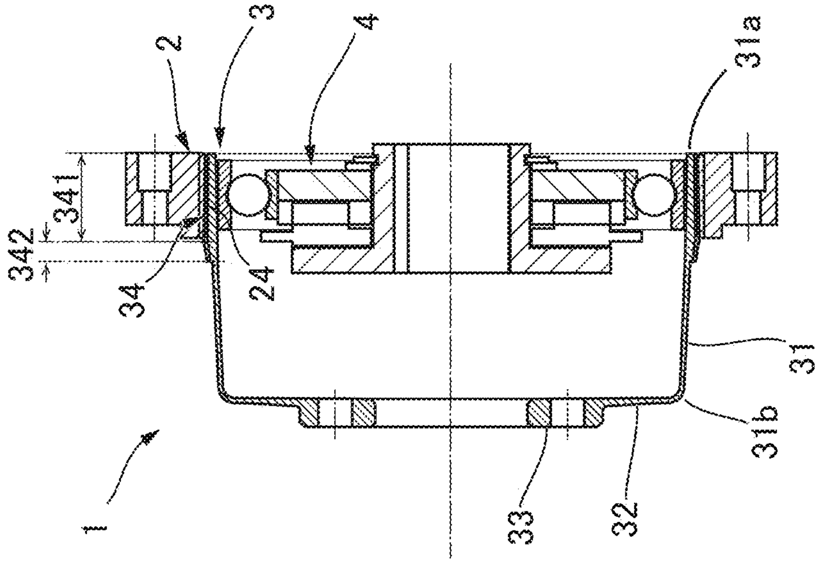

FIG. 1(A) is a longitudinal cross-section of a cup-shaped strain wave gearing according to the present embodiment, and FIG. 1(B) is a schematic diagram showing a state in which internal teeth mesh with external teeth in the strain wave gearing. The strain wave gearing 1 has a rigid annular internally toothed gear 2, a flexible externally toothed gear 3 that is coaxially disposed on the inner side of the internally toothed gear 2, and an ellipsoidally contoured wave generator 4 that is fitted to the inner side of the externally toothed gear 3. The internally toothed gear 2 and the externally toothed gear 3 are spur gears of the same module (m). The difference between the number of teeth of each of the two gears is 2n (n being a positive integer), with the internally toothed gear 2 having more teeth. External teeth 34 of the externally toothed gear 3 are flexed in an ellipsoidal shape by the ellipsoidally contoured wave generator 4 to mesh with internal teeth 24 of the internally toothed gear 2 at two end portions in the direction of the major axis L1 of the ellipsoidal shape. When the wave generator 4 rotates, the positions where the two gears 2, 3 mesh move in the circumferential direction, and the two gears 2, 3 undergo relative rotation that corresponds to the difference between the number of teeth of each of the two gears 2, 3.

The cup-shaped externally toothed gear 3 is provided with: a flexible cylindrical barrel part 31; a diaphragm 32 that extends radially inward continuously with the rear end 31*b* of the cylindrical barrel part 31, the rear end 31*b* being one end thereof; a rigid annular boss 33 that is continuous with the inner-peripheral edge of the diaphragm 32; and the external teeth 34, which are formed on an outer-peripheral-surface portion on the open-end 31*a* side of the cylindrical barrel part 31, the open end 31*a* being the other end (front end) of the cylindrical barrel part 31. The amount by which the cylindrical barrel part 31 is flexed radially outward or inward by the ellipsoidally contoured wave generator 4, which is fitted to an inner-peripheral-surface portion of an external tooth formation portion of the cylindrical barrel part 31, gradually increases from the diaphragm-side rear end 31*b* toward the open end 31*a*.

Figure 2:
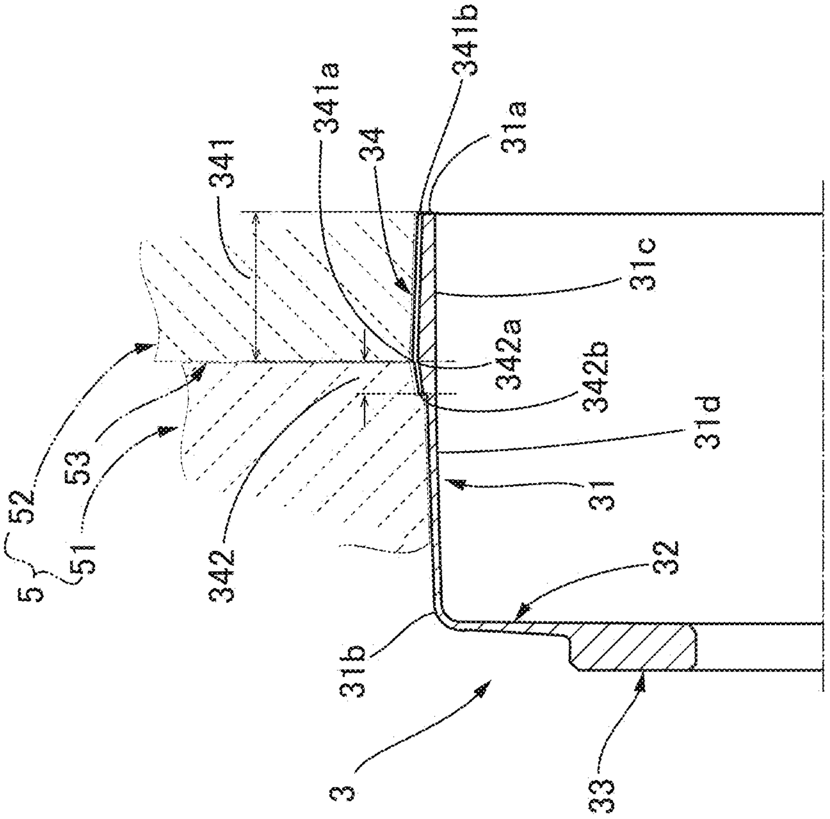
FIG. 2 is a schematic diagram showing an externally toothed gear together with a molding die.
Figure 3:
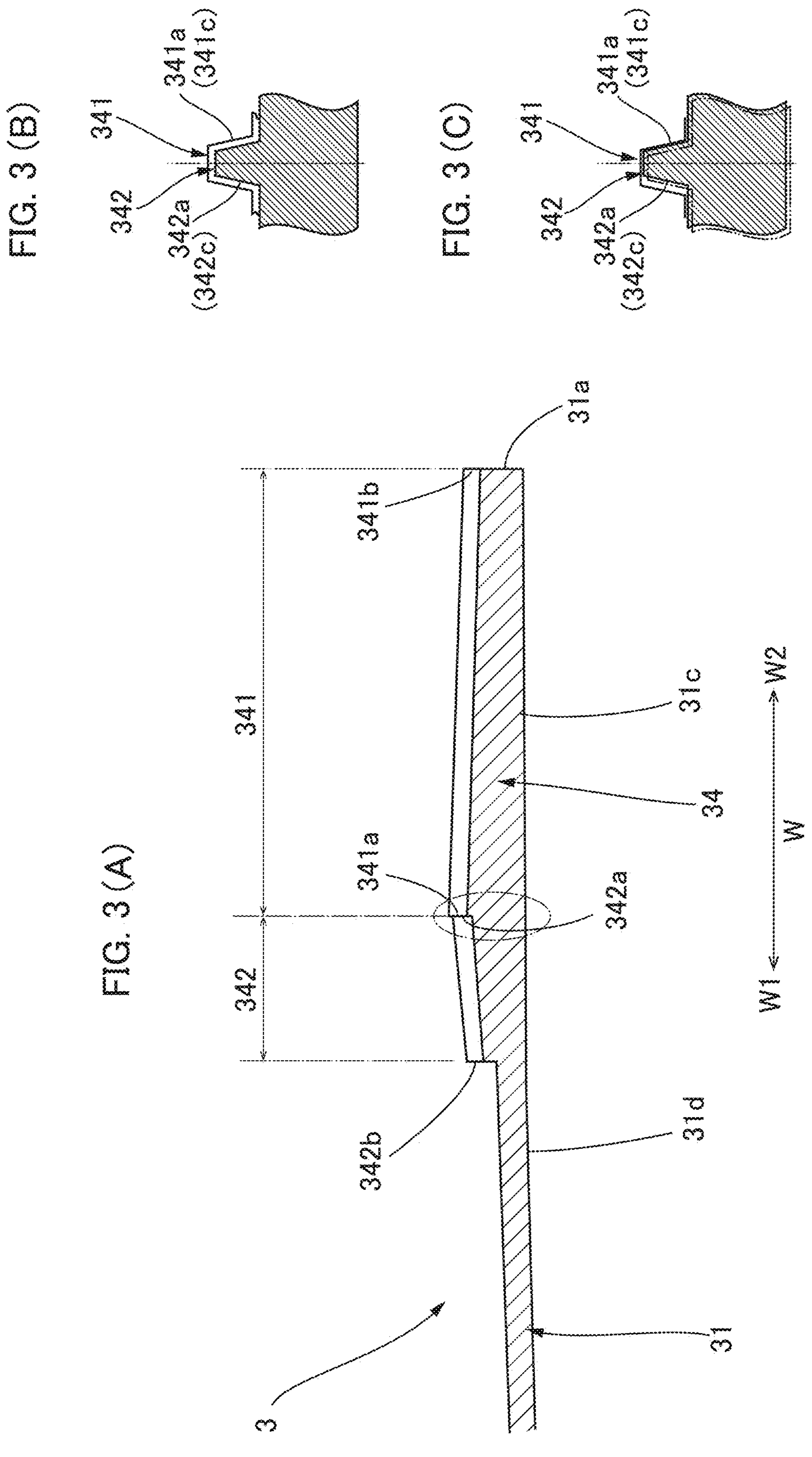
FIG. 3(A) is a schematic diagram showing a portion of the externally toothed gear where the external teeth are formed.
FIG. 3(B) is a schematic diagram showing a state in which tooth profiles in a link between an external tooth portion and an external tooth extension portion are not misaligned.
FIG. 3(C) is a schematic diagram showing a state in which the tooth profiles in the link are misaligned.

FIG. 2 is a schematic diagram showing the externally toothed gear 3 of the strain wave gearing 1, and FIG. 3 includes schematic diagrams showing portions of the external teeth 34 of the externally toothed gear 3. The externally toothed gear 3 is a molded article in which the external teeth 34 are formed integrally on the cylindrical barrel part 31 using a molding die 5, which is shown using virtual lines in FIG. 2. For example, the externally toothed gear 3 can be an injection-molded article made from a thermoplastic resin. The internally toothed gear 2 can similarly be configured as a molded article.

The external teeth 34 of the externally toothed gear 3 shall now be described. The external teeth 34 are each configured from an external tooth portion 341 that is provided with a prescribed effective tooth width and is capable of meshing with the internal teeth 24 of the internally toothed gear 2, and an external tooth extension portion 342 that is formed at a position set off from the internal teeth 24 in the tooth trace direction. The external tooth portion 341 and the external tooth extension portion 342 are formed in the stated order along the tooth trace direction W (refer to FIG. 3) from the end of the external teeth 34 on the open-end 31*a* side toward the diaphragm side. As shall be apparent from FIG. 1(A), the external tooth portions 341 of the external teeth 34 face the internal teeth 24 in a state in which the externally toothed gear 3 is inserted into the internally toothed gear 2. However, the external teeth extension portions 342 are located at positions set off from the internal teeth 24 in the tooth trace direction and do not contribute to meshing with the internal teeth 24.

The molding die 5 for the externally toothed gear 3 is configured from, e.g., a pair of opening/closing dies 51, 52, as shown in FIG. 2. When the opening/closing dies 51, 52 are closed, a cavity for molding the externally toothed gear 3 is formed between the two dies 51, 52. The parting line 53 of the opening/closing dies 51, 52 is set so as to be positioned at the boundaries between the external tooth portions 341 and the external tooth extension portions 342 within the cavity. Thus, after the externally toothed gear 3 has been subjected to being ejected from the molding die and deburring, the boundaries between the external tooth portions 341 and the external tooth extension portions 342 of the external teeth 34 is located at the site where the parting line 53 was positioned.

The tooth profile of the external tooth portions 341 of the external teeth 34 gradually changes along the tooth trace direction. The tooth profile shall now be described with reference to FIG. 3(A). The external tooth portions 341 each have a tapered three-dimensional tooth profile in which the tooth depth is fixed and the top land circle diameter, the root circle diameter, and the tooth thickness gradually decrease from a first end 341*a* of the external tooth portion 341, the first end 341*a* being the diaphragm-side end in the tooth trace direction, toward a second end 341*b* of the external tooth portion 341, the second end 341*b* being the end on the open-end 31*a* side. A first draft angle for ejecting the molded externally toothed gear 3 from the opening/closing die 52 of the molding die 5 in a first direction W1 from the second ends 341*b* toward the first ends 341*a* in the tooth trace direction W is thereby applied to the external tooth portions 341. A tooth profile in which at least the top land circle diameter of the external tooth portions 341 gradually decreases from the first ends 341*a* toward the second ends 341*b* can be employed as the tooth profile of the external tooth portions 341. Additionally, a tooth profile in which the top land circle diameter and at least one from among the tooth depth, the root circle diameter, and the tooth thickness of the external tooth portions 341 gradually decrease from the first ends 341*a* toward the second ends 341*b* can be employed as the tooth profile of the external tooth portions 341.

The external tooth extension portions 342 are used as external tooth insertion guides for instances when the external teeth 34 are inserted between the internal teeth 24 from the first-end 341*a* side along the tooth trace direction, the external tooth extension portions 342 extending, continuously with the first ends 341*a* of the external tooth portions 341, toward the diaphragm (in a direction away from the first ends 341*a*) along the tooth trace direction. As shown in FIG. 3(B), the tooth profile of a connection end 342*a* of each external tooth extension portion 342, the connection ends 342*a* being linked to the first ends 341*a*, is slightly smaller than the tooth profile at the first ends 341*a* of the external tooth portions 341. Therefore, the size of the tooth profile of the external teeth 34 is greatest at the first ends 341*a* of the external tooth portions 341, and the connection ends 342*a* of the external tooth extension portions 342, which are of a smaller size, are linked to the first ends 341*a* in a state in which a difference in level is applied.

In the present example, the tooth depth, the top land circle diameter, the root circle diameter, and the tooth thickness in the tooth profile of the connection ends 342*a* of the external tooth extension portions 342 are slightly less than the tooth depth, the top land circle diameter, the root circle diameter, and the tooth thickness of the first ends 341*a* of the external tooth portions 341, respectively. A tooth profile in which at least the top land circle diameter at the connection ends 342 is less than the top land circle diameter at the first ends 341*a* of the external tooth portions 341 can be employed as the tooth profile of the connection ends 342*a* of the external tooth extension portions 342.

The external tooth extension portions 342 have a tapered three-dimensional tooth profile in which the tooth depth, the top land circle diameter, the root circle diameter, and the tooth thickness gradually decrease from the connection ends 342*a*, which are linked to the first ends 341*a*, toward diaphragm-side distal ends 342*b* along the tooth trace direction W. A second draft angle for ejecting the molded externally toothed gear 3 from the opening/closing die 51 of the molding die 5 in a second direction W2 from the first ends 341*a* toward the second ends 341*b* in the tooth trace direction is thereby applied to the external tooth extension portions 342. The external tooth extension portions 342 function as external tooth insertion guides for instances when the external teeth 34 are inserted between the internal teeth 24 from the first-end 341*a* side along the tooth trace direction.

A tooth profile in which at least the top land circle diameter of the external tooth extension portions 342 gradually decreases from the connection ends 342*a* toward the diaphragm-side distal ends 342*b* along the tooth trace direction can be employed as the tooth profile of the external tooth extension portions 342. Additionally, a tooth profile in which the top land circle diameter and at least one from among the tooth depth, the root circle diameter, and the tooth thickness of the external tooth extension portions 342 gradually decrease from the connection ends 342 toward the diaphragm-side distal ends 342*b* can be employed as the tooth profile of the external tooth extension portions 342.

The shape of the inner peripheral surface of the cylindrical barrel part 31 of the externally toothed gear 3 is defined by, e.g., an inner-peripheral-surface portion 31*c* in which the inside diameter stays the same from the open-end 31*a* side, and an inner-peripheral-surface portion 31*d* in which the inside diameter gradually decreases toward the diaphragm 32, the inner-peripheral-surface portion 31*d* being continuous with the inner-peripheral-surface portion 31*c*.

The internally toothed gear 2 provided with the internal teeth 24 that mesh with the external tooth portions 341 of the external teeth 34 having the aforementioned shape can also be produced as a molded article. The internal teeth 24 of the internally toothed gear 2 can, for example, be configured to have the same tooth profile in the tooth trace direction. The internal teeth 24 can also be configured to have a three-dimensional tooth profile in which a draft angle for die molding to a slight extent in the tooth trace direction is applied.

In the external teeth 34 of the externally toothed gear 3 configured in this manner, the external tooth extension portions 342 do not mesh with the internal teeth 24 of the internally toothed gear 2. Additionally, while the externally toothed gear 3 is being molded using the molding die 5, links between the external tooth portions 341 and the external tooth extension portions 342 are located at positions set off from the effective tooth width of the external tooth portions 341, which mesh with the internal teeth 24, and the parting line 53 of the molding die 5 is positioned at this location while the externally toothed gear 3 is being molded. Thus, any unevenness or other defects in the external tooth extension portions 342 or parting-line 53 traces do not adversely affect the state in which the internal teeth 34 of the externally toothed gear 3 mesh with the internal teeth 24 of the internally toothed gear 2.

Additionally, the external tooth extension portions 342 are tapered such that the tooth profile thereof gradually decreases toward the diaphragm 32 side. The small-diameter external tooth extension portions 342 function as a guide for instances when external teeth 34 are inserted between the internal teeth 24 of the internally toothed gear 2 even if the tooth profile of the external tooth portions 341 is a three-dimensional tooth profile that changes along the tooth trace direction. Therefore, it is easy to carry out work for fitting the externally toothed gear 3 together with the internally toothed gear 2 from the diaphragm 32 side.

Furthermore, the size of the tooth profile of the external tooth extension portions 342, which function as an external tooth insertion guide for instances when the externally toothed gear 3 is inserted into the internally toothed gear 2, is somewhat smaller than the size of the tooth profile at the first ends 341*a* of the external tooth portions 341. The extent to which the size of the tooth profile of the external tooth extension portions 342 is to be made less than the size of the tooth profile at the first ends 341*a* of the external tooth portions 341 is to be set in consideration of misalignment of the opening/closing dies 51, 52 of the molding die 5 in a fastened state.

This prevents the tooth profile of the external tooth extension portions 342, which are linked to the first ends 341*a*, from protruding from the end surface of the first ends 341*a* of the external tooth portions 341 even when the molding die 5 is misaligned. For example, the tooth profile 342*c* at the connection ends 342*a* of the external tooth extension portions 342, which are linked to the external tooth portions 341, can be made one size smaller than the tooth profile 341*c* at the first ends 341*a* of the external tooth portions 341, as shown in FIG. 3(B). In cases where the opening/closing dies 51, 52 of the molding die 5 are misaligned in the fastened state, for example, the tooth profile 342*c* at the connection ends 342*a* of the external tooth extension portions 342 on the opening/closing-die 51 side can be misaligned in the tooth depth direction or the tooth thickness direction relative to the tooth profile 341*c* of the external tooth portions 341 on the opening/closing-die 52 side. Suitably setting the sizes of these two tooth profiles 341*c*, 342*c* makes it possible to avoid instances where the tooth profile 342*c* of the external tooth extension portions 342 protrudes from the tooth profile 341*c* of the external tooth portions 341 in the tooth depth direction or the tooth thickness direction, as shown in FIG. 3(C).

As a result, the largest tooth profile of the external teeth 34 is always the tooth profile 341*c* at the first ends 341*a* of the external tooth portions 341, and it is possible to avoid the problem that a portion protruding from the tooth profile 341*c* in the tooth depth or tooth thickness direction can be produced at portions interlinking the external tooth portions 341 and the external tooth extension portions 342 due to misalignment of the molding die 5, which would make it difficult to insert the external teeth 34 between the internal teeth 24. Additionally, because no such protruding portions are produced, it is possible to easily remove burrs that are produced at the boundaries between the external tooth portions 341 and the external tooth extension portions 342 due to the parting line.

The invention claimed is:

1. A strain wave gearing comprising:
- a rigid internally toothed gear;
- a flexible externally toothed gear that is coaxially disposed on an inner side of the internally toothed gear and is a molded article; and
- a wave generator that is fitted to an inner side of the externally toothed gear,
- wherein each of external teeth of the externally toothed gear includes
  - an external tooth portion that meshes with internal teeth of the internally toothed gear, and
  - an external tooth extension portion that is formed at a position set off from the internal teeth in a tooth trace direction and does not mesh with the internal teeth;
- the external tooth portion is formed such that at least a top land circle diameter gradually decreases from a first end on one side in the tooth trace direction toward a second end on another side in the tooth trace direction, with a first draft angle for die molding in a first direction along the tooth trace direction;
- the external tooth extension portion is an external tooth insertion guide to insert each of the external teeth between the internal teeth from a side of the first end along the tooth trace direction, the external tooth extension portion extending, from a connection end linked to the first end of the external tooth portion with a difference in level therebetween, in a direction away from the connection end along the tooth trace direction;
- a top land circle diameter of the external tooth extension portion at the connection end of the external tooth extension portion is less than the top land circle diameter of the external tooth portion at the first end of the external tooth portion; and
- the top circle diameter of the external tooth extension portion gradually decreases from the connection end in the direction away from the connection end along the tooth trace direction, with a second draft angle for die molding in a second direction opposite to the first draft angle.

2. The strain wave gearing according to claim 1, wherein the external tooth portion has a three-dimensional tooth profile in which the top land circle diameter of the external tooth portion and at least one of a tooth depth, a tooth thickness, and a root circle diameter of the external tooth portion gradually decrease from the first end toward the second end; and
- the external tooth extension portion has a three-dimensional tooth profile in which the top land circle diameter of the external tooth extension portion and at least one of a tooth depth, a tooth thickness, and a root circle diameter of the external tooth extension portion gradually decrease from the connection end in the direction away from the connection end along the tooth trace direction.

3. The strain wave gearing according to claim 1, wherein the externally toothed gear is provided with a cylindrical barrel part that flexes in a radial direction, a diaphragm that extends radially inward from one end of the cylindrical barrel part, and an annular or disc-shaped boss that is formed continuously with an inner-peripheral edge of the diaphragm; and
- the external teeth are formed on an outer-peripheral-surface portion on a side of an open end of the cylindrical barrel part, the open end being another end of the cylindrical barrel part, the first end of the external tooth portion being positioned on a side of the diaphragm, and the second end of the external tooth portion being positioned on the side of the open end.

4. The strain wave gearing according to claim 1, wherein the external tooth extension portion extends from a position radially spaced from an outer portion of the external tooth portion to form the difference in level between the connection end of the external tooth extension portion and the first end of the external tooth portion.

5. The strain wave gearing according to claim 1, wherein in a circumferential direction of the externally toothed gear, a tooth thickness of the external tooth extension portion at the connection end is less than a tooth thickness of the external tooth portion at the first end of the external tooth portion.

6. An externally toothed gear of a strain wave gearing, comprising:
- a cylindrical barrel part that flexes in a radial direction;
- a diaphragm that extends radially inward from one end of the cylindrical barrel part; and
- external teeth that are formed on an outer-peripheral-surface portion on a side of an open end of the cylindrical barrel part, the open end being another end of the cylindrical barrel part,
- wherein the externally toothed gear is a molded article in which the external teeth are formed integrally with the cylindrical barrel part,
- each of the external teeth includes
  - an external tooth portion that is adapted to mesh with internal teeth of an internally toothed gear of the strain wave gearing, and
  - an external tooth extension portion that is adapted not to mesh with the internal teeth;
- the external tooth portion is formed such that at least a top land circle diameter gradually decreases from a first end on one side in a tooth trace direction toward a second end on another side in the tooth trace direction, with a first draft angle for die molding in a first direction along the tooth trace direction;
- the external tooth extension portion is an external tooth insertion guide to insert each of the external teeth between the internal teeth from a side of the first end along the tooth trace direction, the external tooth extension portion extending, from a connection end linked to the first end of the external tooth portion with a difference in level therebetween, in a direction away from the connection end along the tooth trace direction;
- a top land circle diameter of the external tooth extension portion at the connection end of the external tooth extension portion is less than the top land circle diameter of the external tooth portion at the first end of the external tooth portion; and
- the top circle diameter of the external tooth extension portion gradually decreases from the connection end in the direction away from the connection end along the tooth trace direction, with a second draft angle for die molding in a second direction opposite to the first draft angle.

7. The externally toothed gear according to claim 6, wherein the external tooth extension portion extends from a position radially spaced from an outer portion of the external tooth portion to form the difference in level between the connection end of the external tooth extension portion and the first end of the external tooth portion.

8. The externally toothed gear according to claim 6, wherein in a circumferential direction of the externally toothed gear, a tooth thickness of the external tooth extension portion at the connection end is less than a tooth thickness of the external tooth portion at the first end of the external tooth portion.

* * * * *